United States Patent [19]
Kato et al.

[11] Patent Number: 5,503,493
[45] Date of Patent: Apr. 2, 1996

[54] JOINT STRUCTURE FOR SYNTHETIC RESIN STRUCTURAL MEMBERS

[75] Inventors: Kanji Kato, Chiba; Kesaaki Mochizuki, Kukisaki; Kozo Ando; Hiroshi Oya, both of Tokyo; Akira Hamamoto, Yokosuka; Mitsuo Kobayashi, Osaka; Katsuhiko Sakamoto, Takatsuki; Kenichi Fujita, Himeji; Hideto Yabumoto, Suita, all of Japan

[73] Assignees: Ishikawajima-Harima Jukogyo Kabushiki Kaisha, Tokyo; Kabushiki Naisha Nippon Shokubai, Osaka, both of Japan

[21] Appl. No.: 158,264

[22] Filed: Nov. 29, 1993

[30] Foreign Application Priority Data

Dec. 24, 1992 [JP] Japan .................................. 4-357646

[51] Int. Cl.⁶ ................................ E04C 2/38; F16B 7/04
[52] U.S. Cl. ...................... 403/312; 403/344; 403/230; 403/231; 52/655.1; 52/648.1
[58] Field of Search ................................... 403/230, 231, 403/309, 310, 311, 312, 313, 344; 52/651.11, 653.2, 654.1, 655.1, 648.1, 655.2

[56] References Cited

U.S. PATENT DOCUMENTS

| | | | |
|---|---|---|---|
| 1,347,808 | 7/1920 | Franklin | 403/230 X |
| 3,078,080 | 2/1963 | Slough | 52/651.1 X |
| 3,776,549 | 12/1973 | Ganis | 403/312 X |
| 4,094,111 | 6/1978 | Creegan | 52/655.1 X |
| 5,054,197 | 10/1991 | Kato et al. | |
| 5,226,583 | 7/1993 | Imashimizu et al. | 52/653.1 X |

FOREIGN PATENT DOCUMENTS 363016  12/1931  United Kingdom ................ 52/651.01

Primary Examiner—Anthony Knight
Attorney, Agent, or Firm—Oblon, Spivak, McClelland, Maier, & Neustadt

[57] ABSTRACT

Synthetic resin structural members are inserted into a hollow joint member to abut each other in the joint member. A bearing-pressure damping member is fitted into each of bolt holes on the members, axes of bolts extend alternately in two mutually perpendicular directions. The structural members and the hollow joint member are secured with bolts and nuts. Due to damping action resulting from elastic deformations of the damping members, a load is substantially evenly distributed over the whole bolts to prevent concentration of the load to some of the bolts. The arrangement of the bolts with their axes extending alternately in two mutually perpendicular directions will shorten the length of the joint member.

8 Claims, 6 Drawing Sheets

JOINT STRUCTURE FOR SYNTHETIC RESIN STRUCTURAL MEMBERS

BACKGROUND OF THE INVENTION

The present invention relates to a joint structure for synthetic resin structural members such as fiber reinforced plastics (FRP) members which is effective for application of synthetic resin structural members instead of conventional timber members and more specifically effective for application of FRP members as a main framework in a cooling tower so as to increase the corrosion resistance and to simplify the operational control.

Many structural members of synthetic resin have been used instead of timber and metal. However, such synthetic resin members have scarcely been used in circumstances where they are subject to a heavy load.

For instance, in the field of cooling towers for cooling warm water by direct contact with a large quantity of surrounding air, synthetic resin members have been used only partially for small cooling towers for air-conditioning systems or the like.

Generally, large cooling towers, as are used in various chemical industries, include a main or load-bearing framework of timber or steel. Though being typically composed of Douglas fir timber which has been subjected to a pressure-preservative treatment or steel members plated with zinc in a hot dip galvanizing process, the main framework still tends to be easily corroded since it is within the tower which has an atmosphere of extremely high temperature and of extremely high humidity.

A framework composed of timber or steel members typically begins to be corroded after about ten or seven to eight years, respectively, at and around the upper portion of the framework adjacent to a distribution system, and this necessitates repair of the tower.

As the corrosion spreads, the corroded pieces of timber or rust particles disperse into the cooled water, which may result in deterioration of the performance of the cooling tower, such as by clogging of the strainer in the water-cooling system or an increase in the load to which the pump is subjected.

It may be therefore contemplated that the main framework is fabricated from synthetic resin, especially FRP, which exhibits high corrosive resistance in corrosion environment. The main framework cannot be fabricated from single FRP member and is an assembly of columns and horizontal and cross beams so that a structure for securely joining them together must be developed.

To this end, various joint structures have been developed by some of the inventors or the like. For instance, a joint structure for joining hollow FRP members rectangular in cross section was developed as disclosed in Japanese Patent 1st Publication No. 2-245506 (its patent family: U.S. Pat. No. 5054197 and European Patent Laid Open Specification No. 0388222 A2) in which, as shown in FIGS. 1a and 1b, for example two hollow FRP members 1 and 1a rectangular in cross section are joined together by a joint 2 in the form of a hollow FRP member rectangular in cross section, surrounding the members 1 and 1a and having predrilled rivet holes on their side walls. More specifically, the members 1 and 1a to be joined together are fitted through spacers 4 into the joint 2 such that opposed ends of the members 1 and 1a abut against each other. Then, at a site, rivet holes are drilled through side walls of the members 1 and 1a so as to align with the predrilled rivet holes on the corresponding side walls of the joint 2 and blind rivets 3 are driven into these rivet holes. Such operation is repeated to complete all the riveting, whereby the members 1 and 1a are joined together.

In this manner, whenever one blind rivet 3 is to be driven into the members 1 and 1a, a corresponding rivet hole is drilled through the members 1 and 1a and such drilling and riveting are repeated to complete the joining of the members 1 and 1a. Therefore, even when a great number of blind rivets 3 are to be used, rivet holes can be formed with even drilling accuracy so that load can be evenly distributed over the whole blind rivets 3, whereby a required joint strength is obtained.

However, such drilling and riveting operations of the FRP members 1 and 1a through the joint 2 and the blind rivets 3 at a site themselves are very hard and cumbersome as compared with a case where a main framework is constructed from conventional timber structural members. The number of the assembling steps of the former is disadvantageously increased by 10 to 20% as compared with that of the latter.

In order to overcome the problem, it may be contemplated that instead of the blind rivets 3, bolts are used each of which has strength greater than that of a blind rivet. When the joint and the FRP structural members are respectively predrilled for that purpose or for bolting, the diameter of the drilled bolt hole must be greater than that of a bolt to be used by 2 to 3 mm and therefore the load cannot be evenly distributed over the whole bolts because of the drilling and bolting tolerances or inaccuracies. This means that even in use of a plurality of bolts, the whole allowable load does not increase in proportion to the number of bolts (See the broken line in FIG. 4).

It may be suggested that improvement of the drilling accuracy for even distribution of the load over the whole bolts is attained by on-site drilling of a FRP structural member for alignment with the predrilled bolt holes on a joint. However, in fact, it is next to impossible to drill bolt holes diametrically through a FRP structural member in the form of hollow pipe with a required degree of drilling accuracy at a site.

In joining of FRP structural members using a plurality of bolts, however the bolt holes are predrilled with a high degree of drilling accuracy, the pitch of the bolt holes is preferably four times or more as long as the diameter d of the bolts as shown in FIG. 2b so as to ensure a sufficient degree of bearing strength. As a result, portions of the structural members to be used for the joining becomes longer so that a joint to be used becomes also larger and therefore the bolting operation at a site becomes hard.

In order to overcome the above and other problems encountered in the conventional joint structure for joining structural members, the present invention was made to provide a joint structure for securely joining synthetic resin structural members with a plurality of bolts in a simple manner.

BRIEF SUMMARY OF THE INVENTION

In order to overcome the above-described problems, in a first aspect of the present invention, the invention provides a joint structure for synthetic resin hollow structural members comprising a hollow joint member into which said structural members are inserted such that the structural members abut each other at opposed ends thereof, a plurality of bolts extending through said structural members and said joint member such that axes of said bolts extend alternately in two mutually perpendicular directions and a bearing-pressure damping member fitted over each of said bolts so as to prevent deformations of said hollow structural members and said hollow joint member and to substantially evenly distribute a load over the whole bolts, thereby joining said structural members.

In a second aspect of the invention, the invention provides a joint structure for synthetic resin hollow structural members, said structural members being abutted against or intersected with each other at a predetermined angle, comprising a joint member surrounding said structural members, a plurality of bolts extending through said joint member and said structural members such that axes of said bolts extend alternately in two mutually perpendicular two directions and a bearing-pressure damping member fitted over each of said bolts so as to prevent deformations of said hollow joint member and said hollow structural members and to substantially evenly distribute a load over the whole bolts, thereby joining said structural members.

In both the aspects of the invention, the joint member may comprise two halves which are assembled into a unitary structure.

When the synthetic resin hollow structural members are to be jointed together with the bolts in accordance with the first aspect of the present invention, the structural members are abutted against each other in the hollow joint member; the bearing-pressure damping member is fitted over each of the bolts so as to prevent any deformations of the hollow structural members and the hollow joint member and to relieve or compensate adverse effects resulting from the drilling tolerance; and the bolts extend through the joint member and the structural members such that axes of the bolts extend alternately in two mutually perpendicular directions. Damping action due to deformation of the bearing-pressure damping member fitted over the bolt prevents any concentration of a load over some of the bolts and attains even distribution of the load over the whole bolts. The mutually perpendicular alternate arrangement of the bolts reduces in length the portions of the structural members to be used for the joining. The drilling accuracy is compensated or improved.

When the synthetic resin hollow structural members are to be jointed together by abutting the structural members against or intersecting the same with each other with the bolts at a predetermined angle in accordance with the second aspect of the present invention, a joint member surrounds the structural members and the bearing-pressure damping member is fitted over the corresponding bolt so as to prevent any deformations of the hollow structural members and the hollow joint member and to relieve or compensate adverse effects resulting from the drilling tolerance. The bolts are tightened with axes of the bolts extending alternately in two mutually perpendicular directions so that damping action resulting from deformations of the damping members prevents the load to be concentrated to some of the bolts and attains even distribution of the load over the whole bolts, the length of the joint member can be reduced and the drilling accuracy is compensated or improved.

The joint member may comprise two halves, which facilitates the joining operation and enables application to joining of synthetic resin structural members in any joint shapes.

The structural members and the joint member are predrilled in a factory so that the number of joining steps at a site is remarkably reduced and a required joint strength is ensured.

The present invention will become more apparent from the following description of preferred embodiments thereof taken in conjunction with the accompanying drawings.

BRIEF DESCRIPTION OF THE DRAWINGS

FIG. 2b is a front view of a conventional structure illustrated for the sake of comparison with FIG. 2a;

DETAILED DESCRIPTION OF THE PREFERRED EMBODIMENTS

Figure 1A:
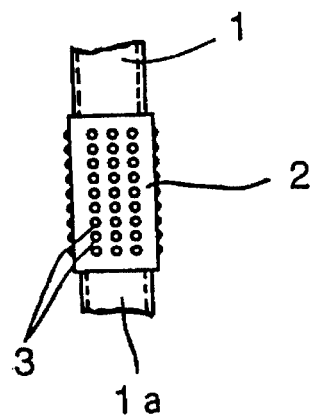
FIG. 1a is a front view of a conventional joint structure for synthetic resin structural members.
Figure 1B:
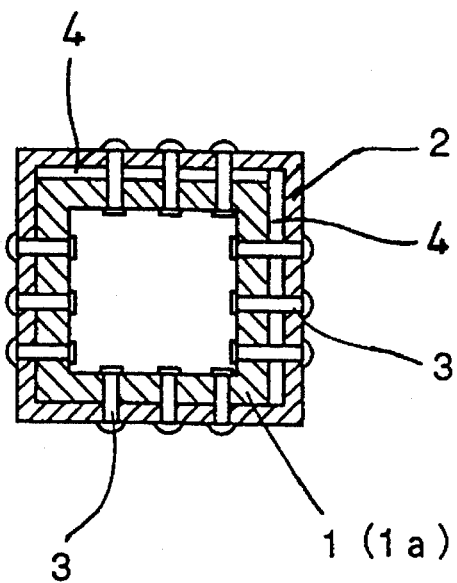
FIG. 1b is a sectional view thereof on an enlarged scale.
Figure 2A:
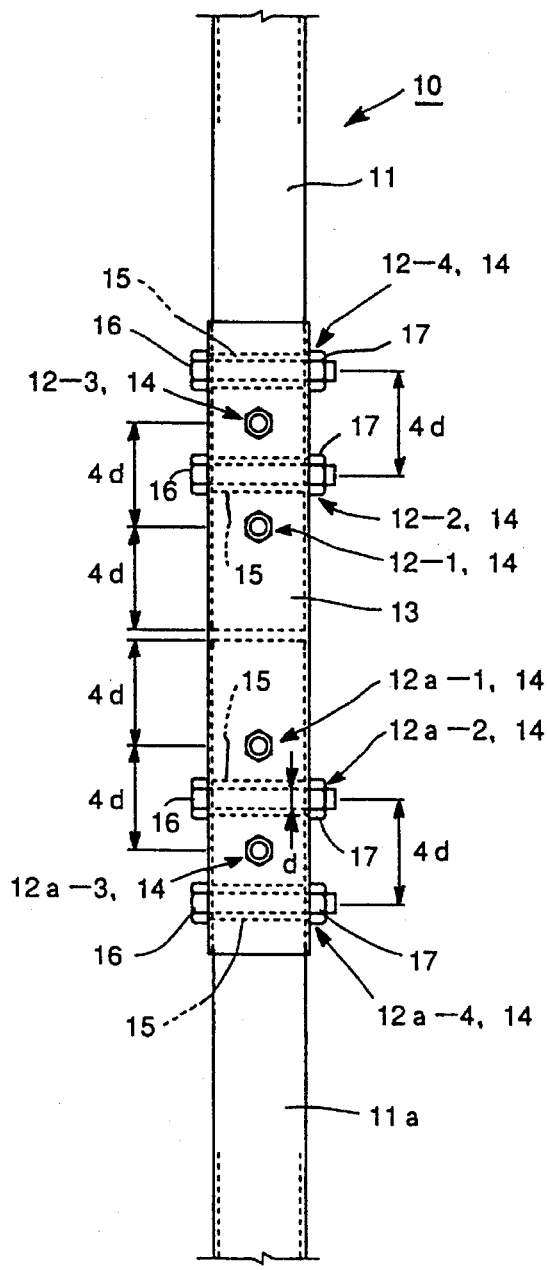
FIG. 2a is a front view of a first embodiment of a joint structure for joining synthetic resin structural members in accordance with the present invention.
Figure 3A:
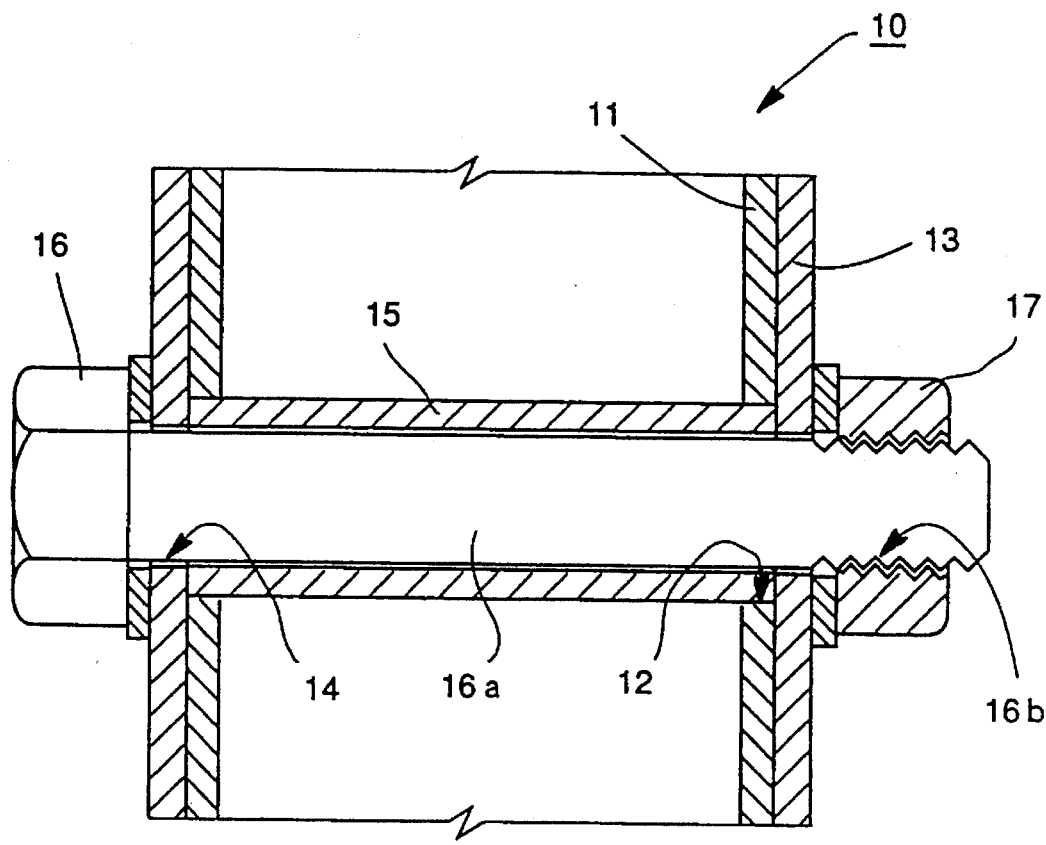
FIG. 3a is a partial sectional view, on an enlarged scale, of the embodiment.
Figure 3B:
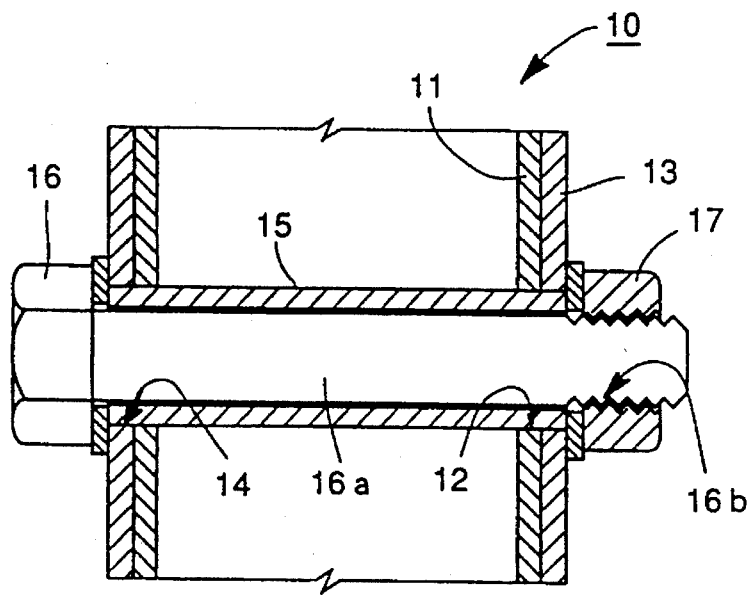
FIG. 3b is a modification thereof.

FIGS. 2a, 3a and 3b illustrate a first embodiment of a joint structure for joining synthetic resin structural members in accordance with the present invention.

In the first embodiment, synthetic resin structural members 11 and 11a are axially joined together by a joint structure generally indicated by reference numeral 10. More specifically, the structural members 11 and 11a in the form of FRP hollow pipes rectangular in cross section are joined together such that each pipe is joined with for example four bolts; in total, eight bolts are used to join the structural members 11 and 11a.

As best shown in FIG. 2a, first bolt holes 12-1 and 12a-1 are predrilled through opposed side walls of the structural members 11 and 11a such that each of the bolt holes 12-1 and 12a-1 is spaced apart from the abutting ends of the structural members 11 and 11a by a distance equal to four times the diameter d of the bolt holes. In like manner, third bolt holes 12-3 and 12a-3 are predrilled through the same walls such that the third bolt holes 12-3 and 12a-3 are respectively spaced apart from the corresponding first bolt holes 12-1 and 12a-1 by a distance also equal to four times the diameter d of the bolt holes. Second bolt holes 12-2 and 12a-2 are predrilled through the remaining opposed side walls of the structural members 11 and 11a perpendicular to the above-mentioned walls having the bolt holes 12-1, 12a-1, 12-3 and 12a-3 such that the second bolt holes 12-2 and 12a-2 are respectively at the mid points between the corresponding first and third bolt holes 12-1 and 12-3 and 12a-1 and 12a-3 (that is, at the positions spaced apart from the abutting ends by a distance more than four times the diameter d of the bolt holes). In like manner, fourth bolt holes 12-4 and 12a-4 are respectively predrilled through the walls having the bolt holes 12-2 and 12a-2 such that the fourth bolt holes 12-4 and 12a-4 are respectively spaced apart from the corresponding second bolt holes 12-2 and 12a-2 by a distance equal to four times the diameter d of the bolt holes.

In order to join the structural members 11 and 11a together, a hollow joint member 13 such as a FRP hollow pipe rectangular in cross section is used into which the structural members 11 and 11a are inserted. Four bolt holes 14 are predrilled through each wall of two opposed side wall pairs of the joint member 13 which are perpendicular with each other such that the four bolt holes 14 of each wall of the joint member 13 corresponds to the above-mentioned four bolt holes 12-1, 12a-1, 12-3 and 12a-3 and 12-2, 12a-2, 12-4 and 12a-4 of the structural members 11 and 11a, respectively.

Next as best shown in. FIG. 3a, a cylindrical bearing-pressure damping member 15 is inserted into each of bolt holes 12-1, 12a-1, 12-2, 12a-2, 12-3, 12a-3, 12-4 and 12a-4 so as not only to prevent any deformations of the joint member 13 and the structural members 11 and 11a due to the bolting but also to avoid any concentration of the load to some of the bolts due to drilling tolerance of the bolt holes 12 and 14. Bolts 16 extend through the bearing-pressure damping members 15.

When the bearing-pressure strength required is less, the bearing-pressure damping member 15 may be used which extends through both the bolt holes 12 and 14 as shown in FIG. 3b. This facilitates mounting operation of the bearing-pressure damping members 15 since the damping members 15 may be inserted from outside of the joint member 13.

Requirements for the damping member 15 so as to accomplish satisfactorily its functions are as follows: The damping member 15 must have a high degree of strength axially of the member 15 so as to prevent the member 15 from being deformed upon tightening of the bolt.

Furthermore, the damping member 15 must be elastic to some extent in the radial direction of the cylinder. When such requirements are satisfied, the concentration of the load to some of the bolts is prevented so that the load can be satisfactorily distributed over the bolts used. For example, a hollow cylinder fabricated from an FRP is used as the damping member 15.

In the case of an FRP hollow cylinder, glass fibers are laminated in the axial direction so that the hollow cylinder has a sufficient degree of resistance to the force applied thereto in the axial direction thereof, but the reinforcement in the radial direction is less so that elastic deformations in the radial direction are allowed to some extent due to the synthetic resin layer. The present invention utilizes these characteristics or properties of an FRP hollow cylinder.

In joining the synthetic resin structural members together, the structural members 11 are preliminarily fitted with such damping members 15 and then inserted into the joint member 13 from the open ends thereof until the opposed ends of the structural members 11 abut against each other. The bolt holes of the damping members 15 fitted into the bolt holes 12 of the structural members 11 and 11a are made aligned with the bolt holes 14 of the hollow joint member 13. Next bolts 16 are inserted through these aligned bolt holes and are tightened by nuts 17.

As shown in FIG. 3a, a shank 16a of the bolt 16 has a length corresponding to the length between the opposed walls of the hollow joint 13 so that the bolt 16 contacts an inner surface of the damping member 15 as well as the bolt holes 14 not at an external thread 16b of the bolt 16 but at the shank 16a.

This prevents offset of the bolt 16 due to any difference in diameter between the shank 16a and the external thread 16b and prevents concentration of the load.

With such joint structure 10, the structural members 11 and 11a are joined together with the hollow joint 13, the bolts 16 and the nuts 17 in a simple manner.

The bolt holes 12 and 14 are predrilled alternately in two directions perpendicular to each other so that the length of the joint member 13 can be decreased in contrast to the number of the bolts used.

Figure 2B:
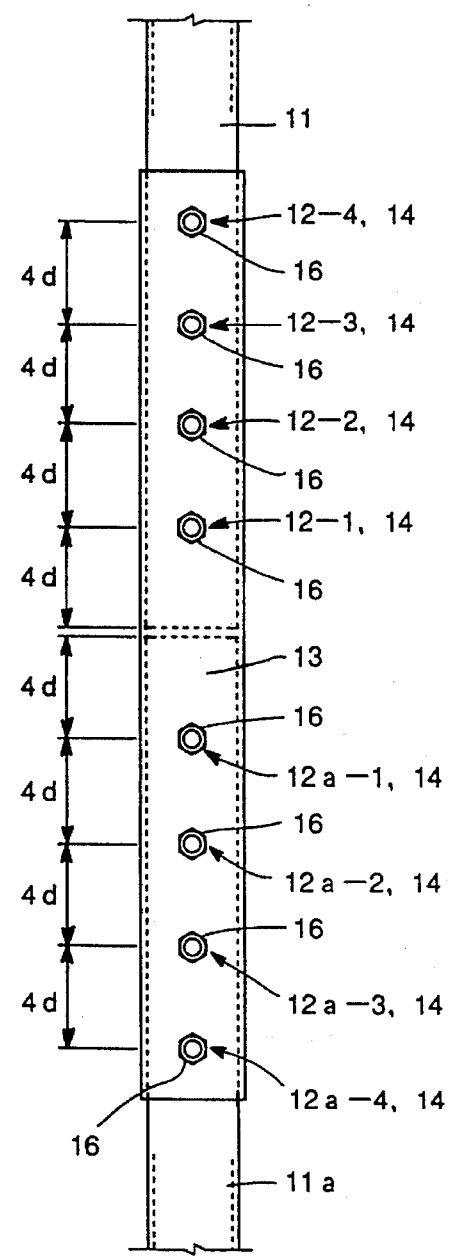

For instance, as compared with the conventional joint structure in which; as best shown in FIG. 2b, four bolts are used along a straight line parallel to the axis of each structural member 11 so that the fourth bolt hole 12-4 is spaced apart from the abutting end of the structural member 11 by 16d, in the joint structure shown in FIG. 2a according to the present invention, the length between the fourth bolt hole 12-4 and the abutting end can be decreased by about 64%.

In the first embodiment, the synthetic resin structural members 11 and 11a are joined with eight bolts 16. In this case, even when there exist some small errors between the pitch of the bolt holes 12 and 12a of the structural members 11 and 11a and the pitch of the bolt holes 14 of the hollow joint 13, the damping member 15 extends through each of the bolt holes 12 so that the load exerted in the axial direction of the structural members 11 and 11a and the hollow joint 13 is substantially uniformly distributed over the whole bolt 16 due the the elastic deformations in the radial direction of the damping members 15, whereby the joint strength is increased in proportion to the number of bolts used.

Figure 4:
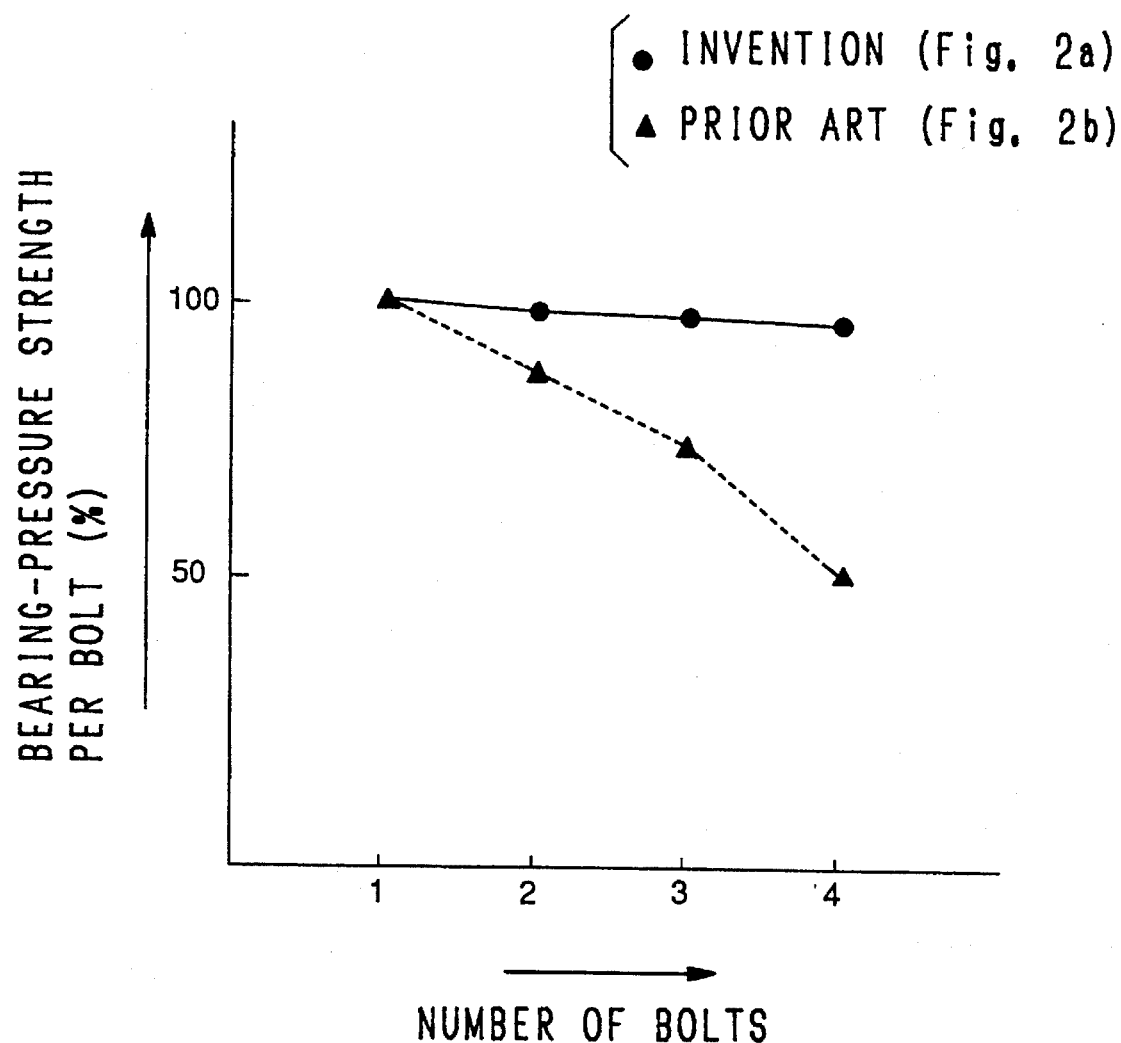
FIG. 4 is a diagram used to explain the comparison in joint strength between the invention and the prior art.

The above-described fact that the joint strength is in proportion to the number of bolts used was confirmed by the results of destruction tests of the full-size main rigid frames as indicated by the solid line in FIG. 4. That is, even when the number of bolts used is increased, the joint strength per bolt can be maintained.

On the other hand, in the conventional joint structure described above with reference to FIG. 2b using no bearing-pressure damping members, as the number of the bolts is increased, the joint strength per bolt is decreased as indicated by the broken line in FIG. 4. For instance, when four bolts are installed, the joint strength per bolt is decreased by about 50% as compared with the case when only one bolt is installed.

Furthermore, according to the first embodiment, as compared with the conventional joint structure using blind rivets, drilling operation at a site is unnecessary and therefore time required for the joining operation can be reduced. For instance, facilitation of the joining operation in accordance with the present invention will be understood from the fact that in order to obtain the joint strength attainable by using four bolts with diameter of 20 mm, the conventional joint structure requires thirty blind rivets 4.8 mm in diameter.

Figure 5:
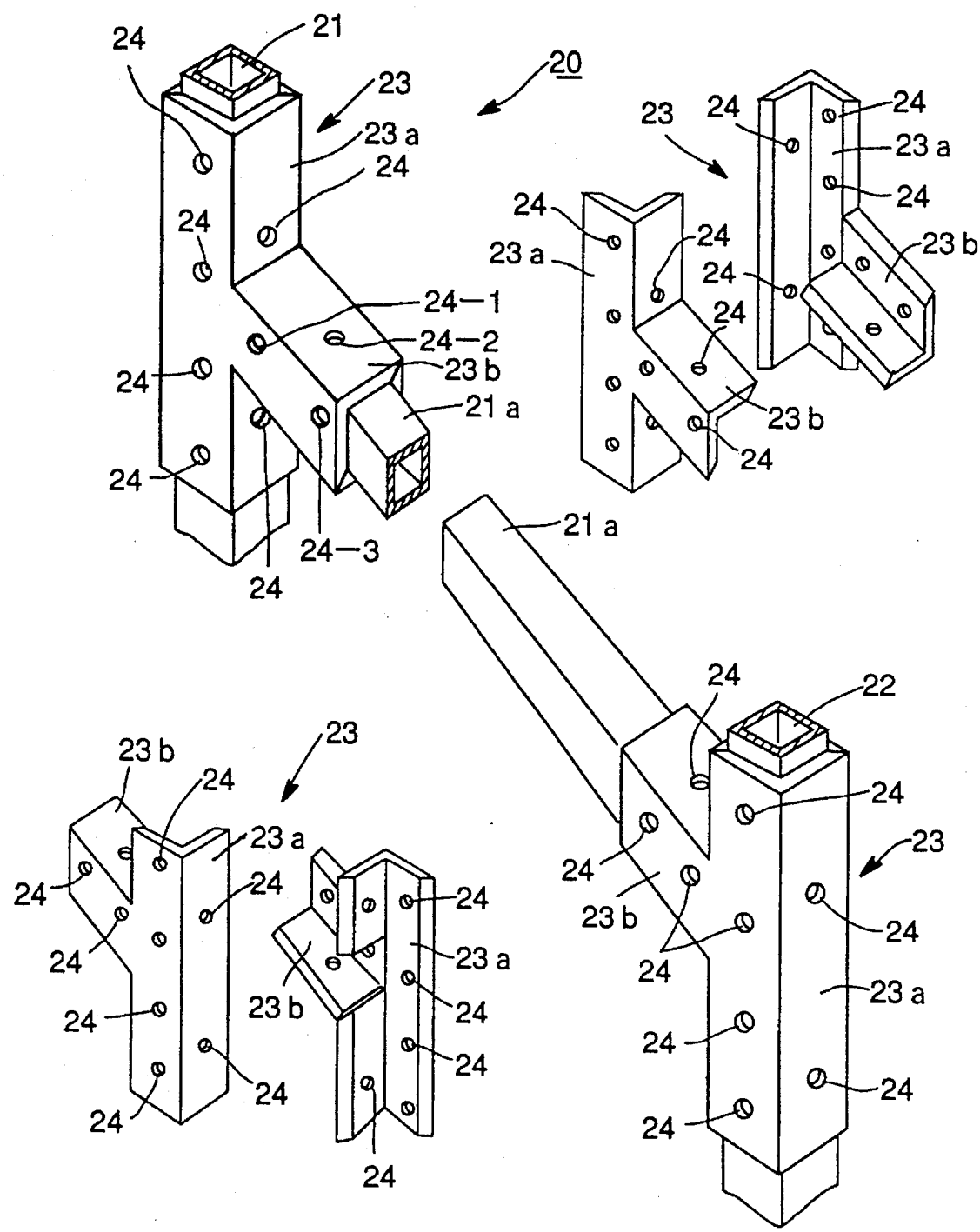
FIG. 5 is a perspective view of a joint structure of a second embodiment of the invention, joint member halves being shown both in assembled state and in exploded state.

Referring next to FIG. 5, a second embodiment of the present invention for joining hollow synthetic resin structural members at a predetermined angle with respect to each other will be described.

In a joint structure generally indicated by reference numeral 20, two synthetic resin structural members 21 and 21a are abutted against each other and joined together at a predetermined angle. The structural member 21a is joined at its one end to the structural member 21 at a predetermined angle and is joined at its other end to a synthetic resin structural member 22 at a predetermined angle. Two or more upper and lower joint structures 20 are employed.

As shown in FIG. 5, two joint structures 20 are substantially similar in structure so that the description of one joint structure shall be enough to understand the second embodiment.

A joint member 23 used in the joint structure 20 comprises a hollow joint portion 23a into which the structural member 21 or 22 is inserted and an inclined hollow joint portion 23b which extends from the joint portion 23a and is inclined at a predetermined angle and into which is inserted the structural member 21a. The joint member 23 may be fabricated from an FRP. The straight and inclined joint portions 23a and 23b may be in the form of an integral unitary structure or may be in the form of a two-halves structure as shown in FIG. 5. Even in the case of the two-halves joint member 23, the opposed side walls of the two halves are predrilled such that bolts extend alternately in two mutually perpendicular directions.

Whether the joint member 23 is fabricated as a unitary structure or a two-halves structure is dependent upon the structural member 21a to be joined at an angle at the site. For instance, when the structural member 21a is to be joined at its ends to the structural members, it may be difficult to use the joint members 23 in the form of unitary structure for both of these ends. Preferably, at least one of these two joint members 23 is in the form of two-halves structure for facilitation of the joining operation.

Alternatively, only one end of the structural member 21a is joined using the joint structure 20 in the form of unitary structure while the other end is joined with conventional riveting.

Opposed side walls of the straight and inclined hollow joint portions 23a and 23b are predrilled such that the drilled bolt holes 24 are alternately perpendicular to each other. First bolt holes 24-1 on the inclined joint portion 23b are spaced apart from the end of the structural member 21a by a distance at least equal to four times the diameter d of the bolt hole. Pitch of bolt holes on the opposed side walls of the inclined joint portion 23b is 4d or more. Pitch of bolt holes 24 on the opposed side walls of the straight joint portion 23a is also 4d or more.

The structural members 21, 21a and 22 are also formed with bolt holes (not shown in FIG. 5) which respectively correspond to the bolt holes 24 of the joint members 23 described above.

In the second embodiment, the bearing-pressure damping members (not shown in FIG. 5) of the type described above in the first embodiment with reference to FIGS. 3a and 3b are inserted into the bolt holes of the structural members 21, 21a and 22 so that not only the deformations of the joint members 23 and the structural members 21, 21a and 22 due to bolting but also concentration of the load due to the bolting tolerances or errors of the bolt holes 24 on the joint members 23 and on the structural members 21, 21a and 22 can be prevented.

As described in the first embodiment, when the bearing-pressure resistance is less, the bearing-pressure damping member 15 of the type shown in FIG. 3b may be inserted throughout the bolt holes 12 and 14 from the outside of the joint 23 for facilitation of the joining operation.

In the joining operation, the structural member 21 having the damping members 15 fitted into the bolt holes of the member 21 is inserted into the straight joint portion 23a of the joint member 23. The structural member 21a is inserted at its one end into the inclined joint portion 23b of the joint member 23 to abut against the structural member 21. Then, the bores or bolt holes of the damping members 15 fitted into the bolt holes of the structural members 21 and 21a are made aligned with the corresponding bolt holes 24 of the joint member 23. The bolts 16 are inserted in the bolt holes and are tightened by the nuts 17 as shown in FIG. 3a or 3b.

As is similar to the case shown in FIG. 3a, a shank 16a of the bolt 16 has a length corresponding to the length between the opposed walls of the hollow joint member 23, which prevents offset of the bolt 16 due to any difference in diameter between the shank 16a and the external thread 16b and prevents concentration of the load.

When the joint structure 20 of the type described above is employed, the synthetic resin structural members 21 and 21a are joined together at a predetermined angle with respect to each other with the bolts and the nuts in a simple manner.

Since the damping members 15 are fitted into the respective bolt holes of the structural members 21, 21a and 22, even when there exist slight errors between the pitches of predrilled bolt holes of the structural members 21, 21a and 22 and the pitches of the bolt holes 24 of the joint member 23, the loads exerted to the structural members 21, 21a and 22 and the joint member 23 are substantially evenly distributed over the whole bolts due to elastic deformations of the damping members 15 in their radial directions so that the joint strength in proportion to the number of bolts used can be attained.

In the joint structure 20, the bolt holes 24 are drilled alternately in the directions perpendicular to each other so that the unit length of the joint per bolt can be decreased.

The joint member 23 may be in the form of a two-halves structure, which facilitates the joining operation and which enables application to, e.g., any joints of a cooling tower.

As shown in FIGS. 6a to 6f as modifications, the joint structure according to the present invention may be applicable to various intersecting or abutting joints such as a T-shaped joint (FIG. 6a), a cross joint (FIG. 6b), a joint for six intersecting synthetic resin structural members (FIG. 6c) and any joint shape desired.

So far the synthetic resin structural members have been described as FRP members, but the present invention is not limited thereto. According to the present invention, the term "synthetic resin structural members" include not only FRP which is a composite material in a narrow sense with thermosetting plastic being matrix but also reinforced plastic members in a broad sense such as FRTP (Fiber Reinforced Thermo Plastics).

Figure 6A:
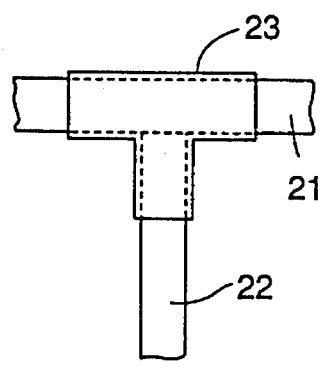
FIGS. 6a to 6f are views showing modifications of a joint structure in accordance with the present invention.
Figure 6B:
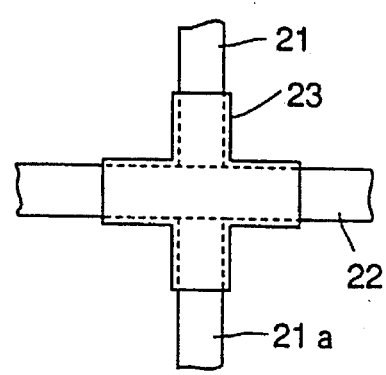
Figure 6C:
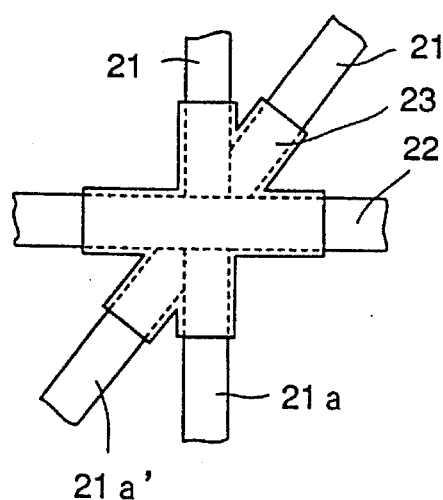
Figure 6D:
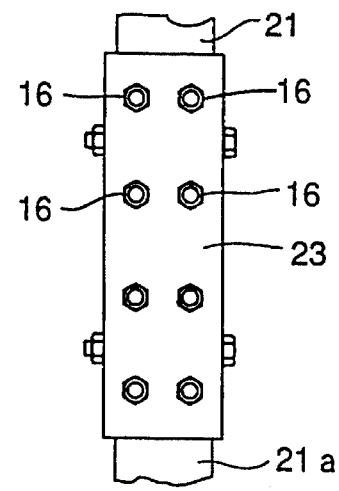

In the above-mentioned embodiments, it has been described that the single bolts extend alternately in two mutually perpendicular directions; but, as shown in FIG. 6d, sets of two or more bolts may be used instead of the single bolts.

Figure 6E:
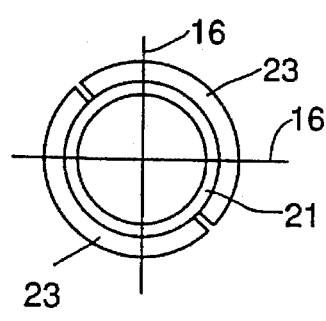
Figure 6F:
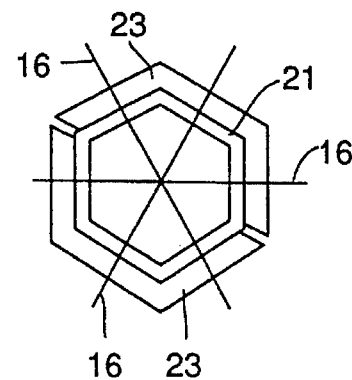

The present invention is not limited only to the synthetic resin structural members rectangular in cross section and may use structural members in various cross sections such as a circular or hexagonal hollow member as shown in FIG. 6e or 6f, respectively. Also in these cases, of course, the joint members used may be in the form of unitary structure or halves structure depending upon the cross sections of the structural members. In the structural members hexagonal in cross section, the directions of the bolts may be in two mutually perpendicular directions or may be in three directions equiangularly spaced apart from each other by 120 degrees.

Thus, it is to be understood that various modifications may be effected without departing from the true spirit of the present invention.

As described above in detail, according to a joint structure for synthetic resin structural members of the present invention, in joining the hollow plastic structural members with a plurality of bolts, they are made to abut against each other in a hollow joint member. Bearing-pressure damping members are used to prevent any deformations of the hollow structural members and the hollow joint member and to decrease any adverse effects resulting from bolting tolerance or errors of bolt holes. The bolts are inserted into their respective bolt holes such that axes of the bolts extend alternately in two mutually perpendicular directions. As a result, due to the damping action resulting from elastic deformations of the damping members, concentration of a load to some of the bolts can be prevented and the load can be substantially evenly distributed over the whole bolts used. The axes of the bolts extend alternately in two mutually perpendicular directions so that the length of the joint member can be reduced with the drilling accuracy being compensated or improved.

According to the present invention, when hollow synthetic resin structural members are abutted against or intersected with each other at a predetermined angle and are to be joined together with a plurality of bolts, the joint member is arranged to surround the abutted or intersected structural members. The bolts each fitted with the bearing-pressure damping member are used to prevent any deformations of the hollow structural members and the hollow joint member and to prevent or decrease the adverse effects resulting from the bolting tolerances or inaccuracy so that concentration of the load over some of the bolts used can be prevented and the load can be substantially evenly distributed over the whole bolts. The arrangement of the the bolts with their axes extending alternately in two mutually perpendicular directions enables the length of the joint to be shortened. The drilling accuracy is compensated or improved.

According to a joint structure for joining synthetic resin structural members of the present invention, the joint member in the form of two-halves structure may be employed which facilitates the joining operation and brings about applicability to joints in any shapes.

According to the present invention, the structural members and the joint members are predrilled in a factory so that the number of steps for joining such members at the site is considerably decreased and a required degree of joint strength is ensured.

When the present invention is applied to fabrication of main frameworks made of FRP for a cooling tower, corrosion can be prevented in a corrosive environment with high temperature and high humidity. As compared with the conventional cooling towers made of wood or steel, the life of the cooling tower can be remarkably prolonged and maintenance and repair costs can be reduced. No admixture of corroded matters into the cooled water occurs so that the operation of the cooling tower is simplified and stabilized without causing deterioration of performances.

What is claimed is:

1. A joint structure for synthetic resin hollow structural members, the joint structure comprising: a hollow joint member into which said structural members are inserted such that the structural members abut each other at opposed ends thereof; a plurality of bolts extending through said structural members and said joint member such that axes of said bolts extend alternately in two mutually perpendicular directions; and a bearing-pressure damping member fitted over each of said bolts to prevent deformations of said hollow structural members and said hollow joint member and to substantially evenly distribute a load over the whole bolts, thereby joining said structural members; wherein:

said plurality of bolts extend through bolt holes in said structural members and said joint member;

a first bolt of said plurality of bolts has a first axis which extends in a first direction and is spaced from the end of its structural member which abuts against the opposed end of the adjacent structural member by a distance which is approximately four times a diameter of said bolt holes;

a second bolt has a second axis which extends in said first direction and is parallel to said first axis, said second bolt being spaced from said first bolt by a distance which is approximately four times the diameter of said bolt holes;

a third bolt has a third axis which extends in a second direction which is perpendicular to said first direction and is positioned between said first and second bolts; and a fourth bolt has a fourth axis which extends in said second direction and is parallel to said third axis, said fourth bolt being spaced from said third bolt by a distance which is approximately four times the diameter of said bolt holes.

2. The joint structure according to claim 1, wherein the joint member comprises two halves which are assembled into a unitary structure.

3. The joint structure according to claim 1, wherein said bearing-pressure damping member extends through said structural member and abuts against inner surfaces of opposing ends of said joint member.

4. The joint structure according to claim 1, wherein said bearing-pressure damping member extends through said structural member and said joint member.

5. A joint structure for synthetic resin hollow structural members, said structural members being abutted against or intersected with each other at a predetermined angle, the joint structure comprising: a joint member surrounding said structural members; a plurality of bolts extending through said joint member and said structural members such that axes of said bolts extend alternately in two mutually perpendicular directions; and a bearing-pressure damping member fitted over each of said bolts to prevent deformations of said hollow joint member and said hollow structural members and to substantially evenly distribute a load over the whole bolts, thereby joining said structural members; wherein:

said plurality of bolts extend through bolt holes in said structural members and said joint member;

a first bolt of said plurality of bolts has a first axis which extends in a first direction and is spaced from the end of its structural member which abuts against the opposed end of the adjacent structural member by a distance which is approximately four times a diameter of said bolt holes;

a second bolt has a second axis which extends in said first direction and is parallel to said first axis, said second bolt being spaced from said first bolt by a distance which is approximately four times the diameter of said bolt holes;

a third bolt has a third axis which extends in a second direction which is perpendicular to said first direction and is positioned between said first and second bolts; and a fourth bolt has a fourth axis which extends in said second direction and is parallel to said third axis, said fourth bolt being spaced from said third bolt by a distance which is approximately four times the diameter of said bolt holes.

6. The joint structure according to claim 5, wherein the joint member comprises two halves which are assembled into a unitary structure.

7. The joint structure according to claim 5, wherein said bearing-pressure damping member extends through said structural member and abuts against inner surfaces of opposing ends of said joint member.

8. The joint structure according to claim 5, wherein said bearing-pressure damping member extends through said structural member and said joint member.

* * * * *

UNITED STATES PATENT AND TRADEMARK OFFICE
CERTIFICATE OF CORRECTION

PATENT NO. : 5,503,493
DATED : April 2, 1996
INVENTOR(S) : Kanji KATO et al.

It is certified that error appears in the above-indentified patent and that said Letters Patent is hereby corrected as shown below:

On the title page, Item [73], the second Assignee is written incorrectly. The Assignees should read:

--[73] Assignees: Ishikawajima-Harima Jukogyo Kabushiki Kaisha, Tokyo; Kabushiki Kaisha Nippon Shokubai, Osaka, both of Japan--

Signed and Sealed this

Fifteenth Day of October, 1996

Attest:

BRUCE LEHMAN

*Attesting Officer*  *Commissioner of Patents and Trademarks*